July 30, 1929.  A. KÄMPFER  1,722,426

SPRING MOUNTING FOR VEHICLES

Filed July 7, 1927

Inventor:

Adolf Kämpfer

Patented July 30, 1929.

1,722,426

UNITED STATES PATENT OFFICE.

ADOLF KÄMPFER, OF BERLIN, GERMANY, ASSIGNOR OF ONE-FOURTH TO MAX KULLER, OF BERLIN-STEGLITZ, GERMANY, AND ONE-HALF TO COUNT EDUARD OPPERSDORFF, OF PARIS, FRANCE.

SPRING MOUNTING FOR VEHICLES.

Application filed July 7, 1927, Serial No. 204,103, and in Germany October 1, 1926.

My invention relates to a spring mounting by means of rollers on the frames of vehicles with variable leverage between the carrying rollers and the spring due to the flattening of the spring and consists in these supporting rollers being arranged in different horizontal planes and at such a distance from each other that they come at intervals into carrying connection with the spring mountings. The invention is based on the surprising discovery that as a result of the abrupt change of leverage in the springs due to the position of the supporting rollers, oscillations of pronounced different magnitudes are produced which exercise such a dampening effect on each other that they are not transmitted to the underframe and car body. This not only brings about a carrying of the vehicle free from all oscillations and vibrations, but greatly saves the spring material from loosing its resiliency prematurely and reduces friction between the various spring leaves.

Embodiments of my invention on motor-run vehicles are shown in the drawing, by way of examples.

Figure 1:
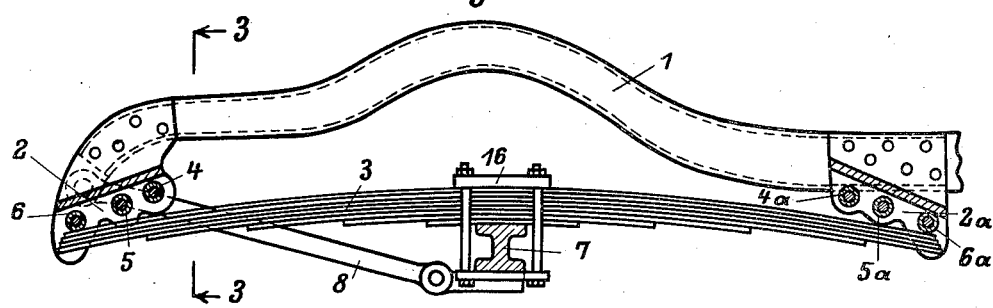
Figs. 1 and 2 illustrate one application of my invention in side elevations with some parts in section and showing the spring in two different positions.
Figure 2:
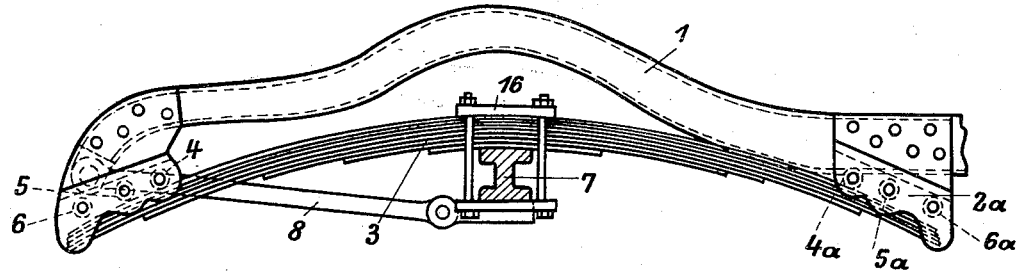
Figure 3:
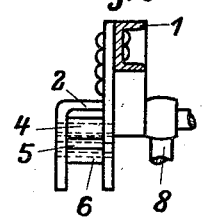
Fig. 3 is a section along line 3—3 of Fig. 1, the spring being not shown.
Figure 4:
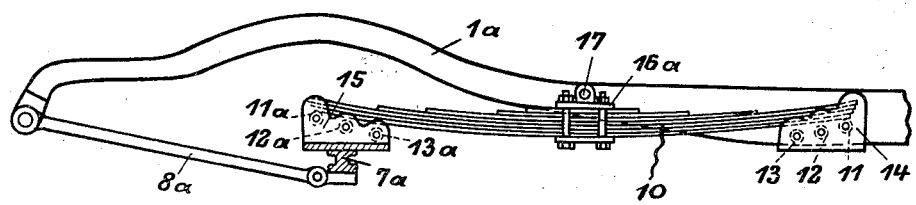
Fig. 4 shows, in a side elevation, a modified form of application.

In the example shown in Figs. 1 and 2 rollers 4, 5, 6 and 4ª, 5ª and 6ª for spring 3 are journalled in the supports 2 and 2ª, secured to the car frame 1, the said rollers serving as supports for the spring 3. In the middle, spring 3 is connected in a well-known manner by means of a clamping device 16 to a vehicle axle 7. In the position shown in Fig. 1 the vehicle is without load and rests by means of the rollers 6 and 6ª on the spring 3. When loaded the spring is pressed down and is supported first by rollers 5 and 5ª and then, as shown in Fig. 2, by rollers 6 and 6ª. The axle 7 is kept in connection with the car frame 1 in a well-known manner by means of rods 8. In the example shown in Fig. 4 of a spring mounting for vehicles one end of the spring 10 projects into the case support 14 in which are mounted the rollers 11, 12, and 13 and which is secured to the frame 1ª. The other end of the spring 10 extends into the case support 15 containing the rollers 11ª, 12ª, and 13ª and carried by the axle 7ª. The clamp block 16ª which holds the spring leaves together is pivotally connected to the frame 1ª by means of the pin 17.

How far apart the rollers must be from each other in each particular case depends on the bearing capacity and amount of oscillation displacement of the spring. To obtain the new effect according to my invention it is only required that supporting rollers come at such intervals into successive engagement with the carrying spring whenever a variable load causes the spring to alter its shape that there is an abrupt and sudden change of leverage. Springs according to my invention can in like manner be used for railway and surface cars.

While I have illustrated rollers 4, 4ª, 5, 5ª, 6 and 6ª and while I preferably use rollers at these points so that as the spring flexes and the ends of the spring move longitudinally, friction will be reduced, yet I do not wish to be limited to this as these rollers constitute at each end of the spring several separate abutments disposed in different horizontal planes and spaced from each other a distance such that the ends of the spring successively and abruptly engage the different abutments as the spring is flexed.

While I have illustrated a construction wherein the spring is carried by the axle and bears against abutments mounted upon the chassis, it will be obvious that an inversion of this will be within the spirit of my invention and that it will be also within the spirit of my invention to provide a spring which was normally bowed upward at its ends instead of downward at its ends as illustrated.

What I claim as my invention and desire to secure by Letters Patent of the United States is:—

1. The combination of a vehicle chassis, an axle, a connection between said chassis and said axle and allowing said axle to oscillate crosswise to said chassis, superposed spring leaves forming a leaf spring secured to said axle, and at least two rollers between each end of said leaf spring and said chassis and adapted to enable said chassis to be carried by said leaf spring, at each end of said leaf spring said supporting rollers being arranged in markedly different horizontal planes and spaced from each other a distance such as to secure an abrupt change of leverage when the spring is flexed successively against said abutments.

2. The combination of a vehicle chassis, an axle, a rod connection between said chassis and said axle and allowing said axle to oscillate crosswise to said chassis, superposed spring leaves forming a leaf spring secured to said axle, and at least two rollers between each end of said leaf spring and said chassis and adapted to enable said chassis to be carried by said leaf spring, at each end of said leaf spring, said supporting rollers being arranged in different horizontal planes and at such a distance from each other that they come successively and suddenly into cooperative connection with said spring to thereby secure an abrupt change of leverage whenever a variable force causes said spring to alter its shape.

3. The combination with a vehicle chassis, a supporting member, superposed leaves forming a compound leaf spring secured to said supporting member, and a plurality of abutments carried by the chassis opposite each end of the spring and with which abutments the ends of the spring successively engage, the abutments being disposed in markedly different planes and spaced from each other a distance such as to secure abrupt changes of leverage when the spring is flexed and successively engages the different abutments.

4. The combination with a vehicle, of a supporting and a supported element, a compound leaf spring carried by one of said elements and supporting at its ends the other element, of a series of abutments associated with each end of the spring and carried by the last named element and against which the ends of the spring successively bear, the abutments of each series being disposed in different horizontal planes and in such spaced relation as to secure abrupt changes of leverage when the spring is flexed and successively engages said abutments.

ADOLF KÄMPFER.